(12) United States Patent
Daoud

(10) Patent No.: US 6,263,144 B1
(45) Date of Patent: Jul. 17, 2001

(54) FIBER-OPTIC CABLE ROUTING AND STORAGE DEVICE

(75) Inventor: Bassel Hage Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/390,829

(22) Filed: Sep. 7, 1999

(51) Int. Cl.[7] .................................................. G02B 6/00
(52) U.S. Cl. ........................................ 385/135; 385/134
(58) Field of Search .................................. 385/135, 134, 385/136, 137, 138, 139

(56) References Cited

U.S. PATENT DOCUMENTS 6,192,181 * 2/2001 Haataja et al. ....................... 385/136

* cited by examiner

Primary Examiner—Hung Xuan Dang
(74) Attorney, Agent, or Firm—Stroock & Stroock & Lavan LLP

(57) ABSTRACT

A fiber-optic cable routing and storage device adapted to store a significant length of fiber-optic cable in a relatively small footprint while ensuring that a minimum bend radius is provided for the stored cable to prevent damage thereto.

20 Claims, 2 Drawing Sheets

FIBER-OPTIC CABLE ROUTING AND STORAGE DEVICE

FIELD OF THE INVENTION

The present invention relates to fiber-optic cable routing and storage devices and, more particularly, to a fiber-optic cable routing and storage device for use in a fiber optic-cable enclosure and that provides fiber-optic cable storage in a relatively small area while ensuring a minimum bend radius for the stored fiber-optic cable.

BACKGROUND OF THE INVENTION

Fiber-optic cable may be stored in enclosures having a relatively small footprint (i.e., small volume) and that can accommodate a significant length of fiber-optic cable. In such enclosures, it is desirable to manage the length of stored cable and to ensure that the cable is not damaged by excessive bending or otherwise. It is also desirable to provide a cable guide that does not impeded access to other components, devices, connectors, etc. provided within or as part of the enclosure.

SUMMARY OF THE INVENTION

The present invention is directed to a fiber-optic cable routing and storage device that accommodates a significant length of fiber-optic cable in a relatively small footprint and that ensures that a minimum bend radius is provided for the stored cable.

In a first embodiment of the present invention, a fiber-optic cable routing and storage device for use in a fiber-optic cable enclosure comprises a first generally U-shaped part and a second generally U-shaped part that together define a continuous fiber-optic cable routing path over which a fiber-optic cable may be routed. The routing path comprises a first routing part having a first section, a transition, and a second section. The fiber-optic cable is routable over the first section in a first direction, over the transition in a direction generally transverse to the first direction, and over the second section in a direction generally opposite of the first direction. The routing path also comprises a second routing part over which the fiber-optic cable may be routed in a direction generally orthogonal to the second direction.

In another embodiment of the present invention, a fiber-optic cable routing and storage device for use in a fiber-optic cable enclosure comprises a continuous fiber-optic cable routing path over which a fiber-optic cable may be routed. The routing path comprises a first surface including a generally planar part and a generally arcuate part, and a second surface disposed generally orthogonally with respect to the first surface and including a generally planar part and a generally arcuate part. The fiber-optic cable is routable continuously on the cable routing and storage device over the first and second surfaces.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a fiber-optic cable routing and storage device adapted to store a significant length of fiber-optic cable in a relatively small footprint while ensuring that a minimum bend radius is provided for the stored cable to prevent damage thereto.

Figure 1:
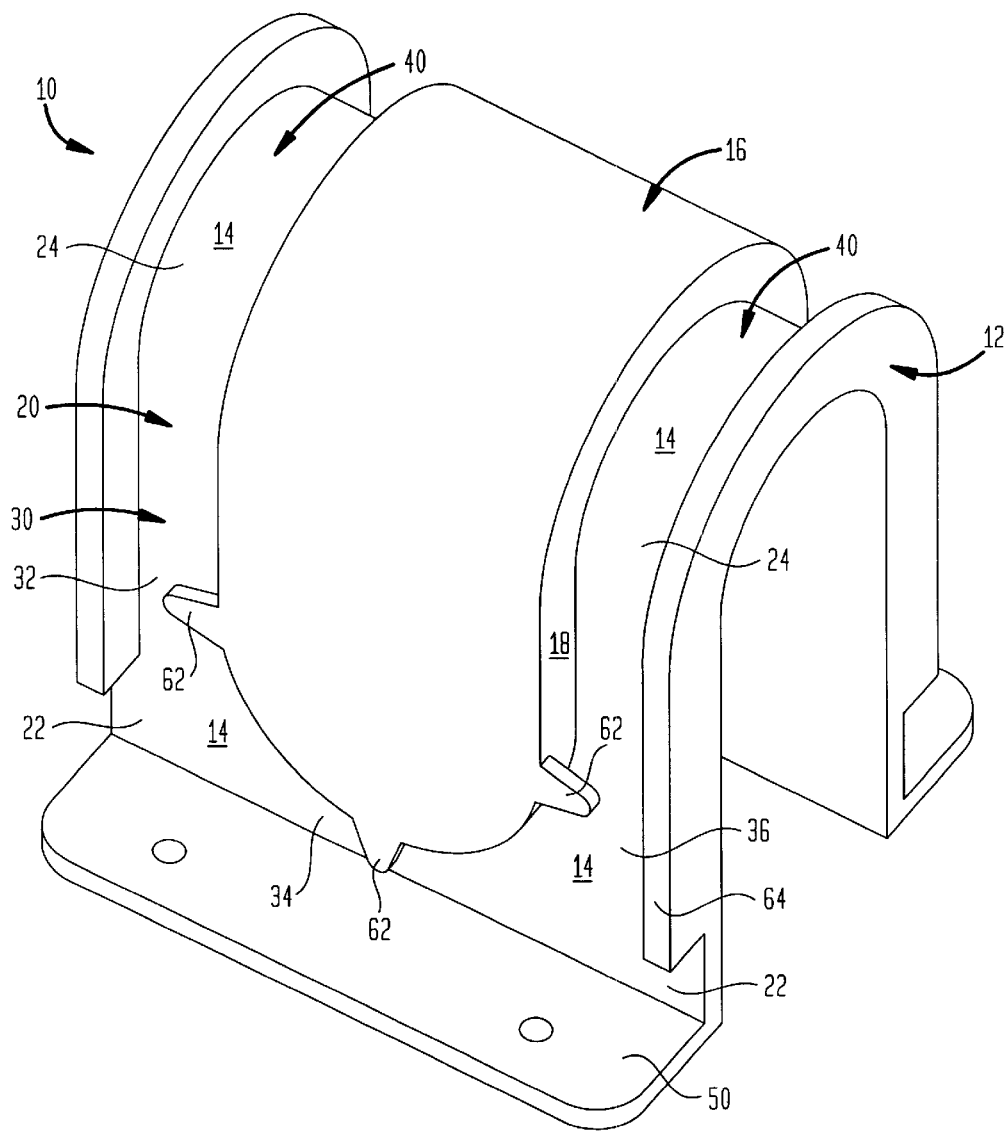
FIG. 1 is a perspective view of a fiber-optic cable routing and storage device constructed in accordance with the present invention.
Figure 2:
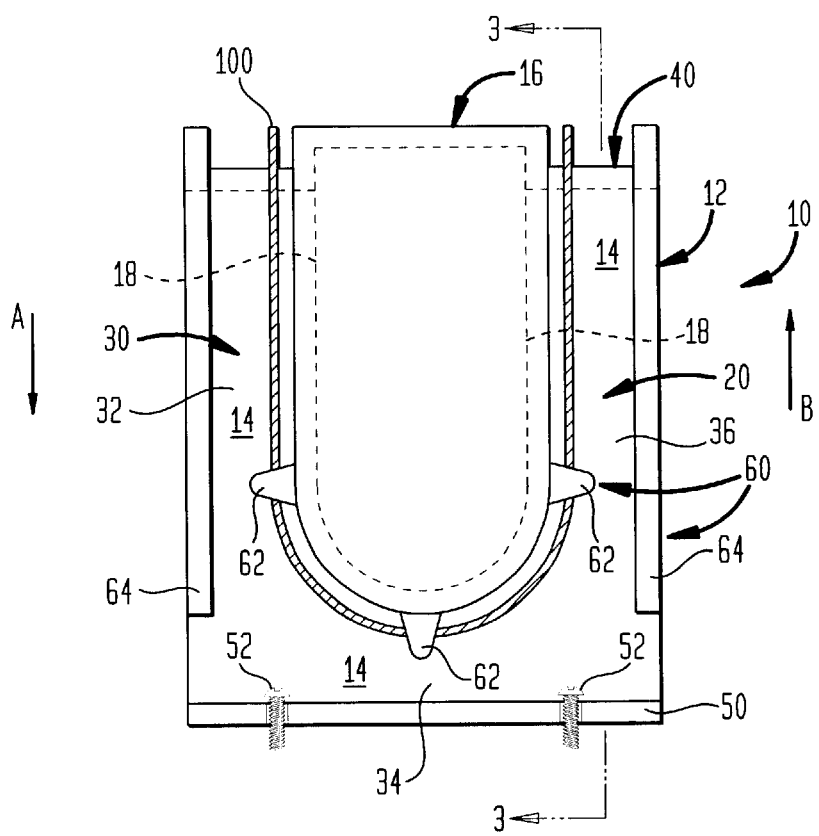
FIG. 2 is a side view of the routing and storage device of FIG. 1.
Figure 3:
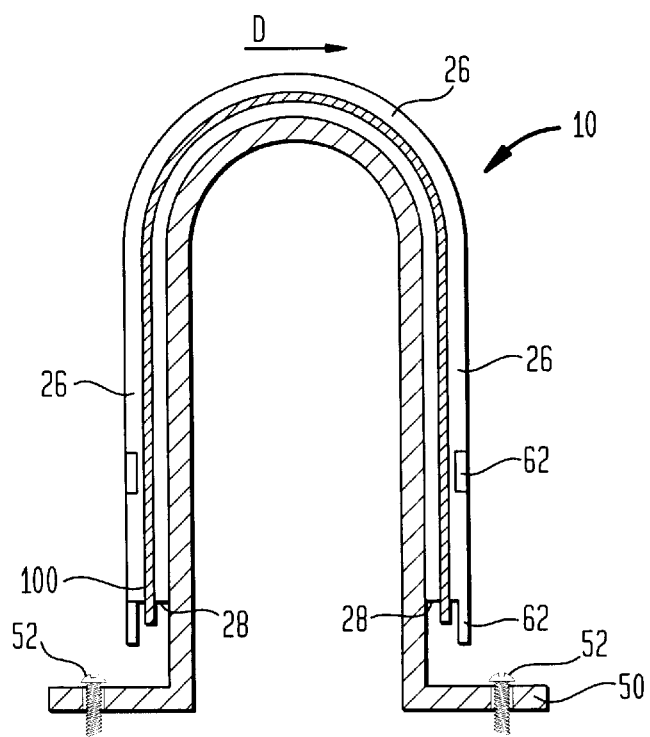
FIG. 3 is a cross-sectional view of the routing and storage device of FIG. 2 taken along the line 3—3.

Referring now to the drawings in detail, FIGS. 1–3 depict a fiber-optic cable routing and storage device 10 adapted to store a length or a plurality of fiber-optic cables 100 (only one cable 100 is depicted in the drawing figures for clarity and ease of discussion). The routing and storage device 10 is preferably although not necessarily mountable in a fiber-optic enclosure (not shown) that provides protection, cable management and storage, and interconnection of various fiberoptic cables as part of a fiber-optic network. The enclosure may be located outside of or within a building, as a matter of design choice. The routing and storage device 10 of the present invention may be used at any point in a fiber-optic network where it is desirable to manage (i.e., route, guide, store, etc.) a significant length or a plurality of fiber-optic cables 100. The relative dimensions of the routing and storage device 10 depicted in the drawing figures are merely illustrative and non-limiting. It will be obvious to persons skilled in the art that any or all of the dimensions of the illustrated routing and storage device 10 may be changed without departing from the spirit or intent of the present invention.

The routing and storage device 10 includes a first generally U-shaped part 12 and a second generally U-shaped part 16, which are arranged in nested relation with each other as an inverted U. Although depicted in the drawings and disclosed as being generally U-shaped, the first and second parts 12,16 may be generally arcuately-shaped. The first and second U-shaped parts 12, 16 together define a continuous fiber-optic routing path 20 over which a fiber-optic cable 100 (or a plurality of cables 100) may be routed. The routing path 20 includes a first routing part 30 that includes a first section 32, a transition 34, and a second section 36. A first routing part 30 is provided on each side of the first U-shaped part 12. The routing and storage device 10 has a first surface 14 defined over the first section 33, transition 34, second section 36, and second routing part 40. The first surface also has a substantially planar part 22 (disposed in the first routing part 30) which defines a first plane and a substantially arcuate part 24 (disposed in the second routing part 40) which defines a second plane that is generally orthogonal to the first plane. The routing and storage device 10 also has a second surface 18 that is disposed generally orthogonally with respect to the first surface 14 and that also includes a substantially planar part 26 and a substantially arcuate part 28. The arcuate part 24 of the first surface 14 generally defines the second routing part 40 and the arcuate part 28 of the second surface 18 generally defines the transition 34. The cable 100 is routable on the first surface 14 and is guided by the second surface 18 as the cable is routed along the continuous routing path 20.

A fiber-optic cable 100 may be routed over the first routing part 30 in a first direction generally indicated by arrow A, then over the transition 34 in a direction generally orthogonal to the first direction and indicated by arrow C, and then in a second direction that is opposite of the first direction and generally indicated by arrow B (see, e.g., FIG. 2). The cable 100 is routed over the first routing part 30 along the plane defined by the substantially planar part 22 of the first surface 14.

The routing path 20 also includes a second routing part 40 which is generally arcuately shaped and over which the cable 100 may be routed in a direction generally orthogonal to the first and second directions and as indicated by arrow D in FIG. 3. Preferably both the transition 34 and the second routing part 40 ensure that the bend radius of the stored cable 100 is at least approximately ¼ inch, although the precise bend radius chosen is an application specific matter of design choice.

The cable 100 (or the plurality of cables 100) is guided on the routing and storage device 10 by a cable guide 60 that comprises a plurality of tabs 62 provided on the second U-shaped part 16 and that extend generally perpendicular from the second surface 18 and generally parallel with the first surface 14. The tabs 62 are preferably disposed near the transition 34 (i.e., about the arcuate part 28 of the second surface 18) to provide cable guidance as the cable 100 is routed over the transition 34 and along the cable routing path 20. The cable guide 60 also comprises a lip 64 provided on the first U-shaped part 12 and that extends generally perpendicularly from the first surface 14 and generally parallel with the second surface 18. The lip 64 is preferably disposed near the first section 32, second section 36 and second routing part 40, and provides cable guidance as the cable 100 is routed over the cable routing path 20.

A base 50 connected to the first U-shaped part 12 and extending generally perpendicular from the substantially planar part 22 of the first surface 14 is provided to secure the routing and storage device 10 in the enclosure. Screws 52 are depicted in FIGS. 2 and 3, but other fasteners such as, for example, rivets, welds, spot-welds, adhesives, etc. may be used to secure the routing and storage device 10 in place.

In use, a fiber-optic cable 100 is routed over the first routing part 30, specifically, over the first section 32 in a generally downward direction (in the drawings). The routing direction then changes approximately 90° as the cable 100 is routed over the transition 34 with a bend radius of at least ¼ inch. The routing direction then changes again approximately 90° (approximately 180° from the routing direction over the first section 32) as the cable 100 is routed over the second section 36 in a generally upwards direction (in the drawings). Routing over the first routing part 30 is substantially on a single plane, i.e., the plane defined by the substantially planar part 22 of the first surface 14.

The cable 100 is then routed over the second routing part 40 and the routing direction changes by approximately 90° and along a different plane than that defined by the substantially planar part 22 of the first surface 14. The cable 100 is then routed again over the first routing part 30 provided another side of the first U-shaped part 12, as described above.

The routing and storage device 10 of the present invention thus provides a continuous fiber-optic cable routing path 20 over which a fiber-optic cable 100 (or a plurality of cables) may be routed. The nested U-shaped parts 12, 16 serve to define the continuous routing path 20 and to ensure that a minimum bend radius of at least approximately ¼ inch is provided for the routed cable 100. With the routing and storage device 10 of the present invention, a significant length of fiber-optic cable 100 may be stored in a relatively small footprint within a fiber-optic enclosure.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic cable routing and storage device for use in a fiber-optic cable enclosure, said cable routing and storage device comprising:

a first generally arcuately-shaped part and a second generally arcuately-shaped part, said first and said second generally arcuately-shaped parts together defining a continuous fiber-optic cable routing path over which a fiber-optic cable may be routed, said routing path comprising:

a first routing part having a first section, a transition, and a second section, the fiber-optic cable being routable over said first section in a first direction, over said transition in a direction generally transverse to said first direction, and over said second section in a direction generally opposite of said first direction; and a second routing part over which the fiber-optic cable may be routed in a direction generally orthogonal to said second direction.

2. A fiber-optic cable routing and storage device as recited by claim 1, wherein said first and said second generally arcuately-shaped parts are arranged in nested relation to each other.

3. A fiber-optic cable routing and storage device as recited by claim 1, further comprising a cable guide disposed along said cable routing path for guiding the fiber-optic cable along said cable routing path.

4. A fiber-optic cable routing and storage device as recited by claim 3, wherein said cable guide comprises a plurality of tabs extending from said second generally arcuately-shaped part.

5. A fiber-optic cable routing and storage device as recited by claim 4, wherein said plurality of tabs extend from said second generally arcuately-shaped part near said transition.

6. A fiber-optic cable routing and storage device as recited by claim 4, wherein said cable guide further comprises a lip extending from said first generally arcuately-shaped part.

7. A fiber-optic cable routing and storage device as recited by claim 6, wherein said lip extends from said first generally arcuately-shaped part adjacent said first section, said second section and said second routing part.

8. A fiber-optic cable routing and storage device as recited by claim 1, wherein said second direction is approximately 180° from said first direction.

9. A fiber-optic cable routing and storage device as recited by claim 1, wherein said transition defines a generally arcuate part of said cable routing path that ensures that the fiber-optic cable does not bend more than a predetermined amount as the cable is routed over said cable routing path.

10. A fiber-optic cable routing and storage device as recited by claim 1, wherein said second routing part defines a generally arcuate part of said cable routing path that ensures that the fiber-optic cable does not bend more than a predetermined amount as the cable is routed over said cable routing path.

11. A fiber-optic cable routing and storage device as recited by claim 1, wherein said first routing part is substantially planar.

12. A fiber-optic cable routing and storage device as recited by claim 1, further comprising a base connected to said first generally arcuately-shaped part for securing said cable routing and storage device to the enclosure.

13. A fiber-optic storage device as recited by claim 1, wherein said first routing part defines a first plane and wherein said second routing part defines a second plane that is generally orthogonal to said first plane, and wherein the fiber-optic cable is routable over said first routing part along said first plane and wherein said fiber-optic cable is routable over said second routing part along said second plane.

14. A fiber-optic cable routing and storage device comprising:
   a continuous fiber-optic cable routing path over which a fiber-optic cable may be routed, said routing path comprising:
      a first surface including a generally planar part and a generally arcuate part; and
      a second surface disposed generally orthogonally with respect to said first surface and including a generally planar part and a generally arcuate part, the fiber-optic cable being routable continuously on said cable routing and storage device on said first surface and being guided by said second surface.

15. A fiber-optic cable routing and storage device as recited by claim 14, further comprising a cable guide disposed along said cable routing path for guiding the fiber-optic cable along said cable routing path.

16. A fiber-optic cable routing and storage device as recited by claim 15, wherein said cable guide comprises a plurality of tabs extending generally perpendicular from said second surface and generally parallel with said first surface.

17. A fiber-optic cable routing and storage device as recited by claim 16, wherein said cable guide comprises a plurality of tabs extending generally perpendicular near said generally arcuate part of said second surface.

18. A fiber-optic cable routing and storage device as recited by claim 16, wherein said cable guide further comprises a lip extending generally perpendicular from said first surface and generally parallel with said second surface.

19. A fiber-optic cable routing and storage device as recited by claim 18, wherein said cable guide further comprises a lip extending generally perpendicular from said first surface along said generally planar part and along said generally arcuate part of said first surface.

20. A fiber-optic cable routing and storage device as recited by claim 14, further comprising a base extending generally perpendicularly from said substantially planar part of said first surface and for securing said cable routing and storage device to the enclosure.

* * * * *